US008427113B2

(12) United States Patent
Xing et al.

(10) Patent No.: US 8,427,113 B2
(45) Date of Patent: *Apr. 23, 2013

(54) VOLTAGE CONVERTER WITH COMBINED BUCK CONVERTER AND CAPACITIVE VOLTAGE DIVIDER

(75) Inventors: Kun Xing, Cary, NC (US); Greg J. Miller, Cary, NC (US)

(73) Assignee: Intersil Americas LLC, Milpitas, CA (US)

( * ) Notice: Subject to any disclaimer, the term of this patent is extended or adjusted under 35 U.S.C. 154(b) by 943 days.

This patent is subject to a terminal disclaimer.

(21) Appl. No.: 12/178,050

(22) Filed: Jul. 23, 2008

(65) Prior Publication Data
US 2009/0033289 A1    Feb. 5, 2009

Related U.S. Application Data

(60) Provisional application No. 60/953,254, filed on Aug. 1, 2007, provisional application No. 61/058,426, filed on Jun. 3, 2008.

(51) Int. Cl.
*H02J 7/04* (2006.01)
*G05F 1/00* (2006.01)

(52) U.S. Cl.
USPC ............ 320/145; 320/140; 323/282; 323/283

(58) Field of Classification Search .................. 320/166, 320/167, 140, 141, 145, 164; 323/282, 283
See application file for complete search history.

(56) References Cited

U.S. PATENT DOCUMENTS

| 4,413,224 A | 11/1983 | Krupka et al. |
| 4,521,726 A | 6/1985 | Budnik |
| 4,658,204 A | 4/1987 | Goodwin |

(Continued)

FOREIGN PATENT DOCUMENTS

| DE | 3343883 A1 | 6/1984 |
| DE | 4206478 A1 | 9/1993 |

(Continued)

OTHER PUBLICATIONS

Hara, N. et al. "Realization and Analysis of a New Switched-Capacitor Coilless Powersupply for One-Chip IC Implementation." Systems & Computers in Japan, Wiley, Hoboken, NJ, US. vol. 29, No. 12, Nov. 15, 1998 pp. 19-33. XP000821933.

(Continued)

*Primary Examiner* — Richard V Muralidar
(74) *Attorney, Agent, or Firm* — Gary Stanford (57) ABSTRACT

A voltage converter including a buck converter and a capacitive voltage divider. The converter includes four capacitors, a switch circuit, an inductor and a controller. A first capacitor is coupled between a reference node and a first output node which develops a first output voltage. A second capacitor is coupled between an input node and either the reference node or the first output node. The switch circuit couples a third capacitor between the reference and first output nodes in a first state of a PWM signal, and couples the third capacitor between the first output and input nodes in a second PWM signal state. The inductor is coupled to the third capacitor and provides a second output node coupled to the fourth capacitor providing a second output voltage. The controller controls the duty cycle of the PWM signal to regulate the second output voltage to a predetermined level.

20 Claims, 5 Drawing Sheets

U.S. PATENT DOCUMENTS

| | | | |
|---|---|---|---|
| 4,801,859 A | 1/1989 | Dishner | |
| 5,382,893 A | 1/1995 | Dehnel | |
| 5,399,958 A | 3/1995 | Iyoda | |
| 5,514,947 A | 5/1996 | Berg | |
| 5,705,919 A | 1/1998 | Wilcox | |
| 5,731,694 A | 3/1998 | Wilcox et al. | |
| 5,747,977 A | 5/1998 | Hwang | |
| 5,760,495 A | 6/1998 | Mekanik | |
| 5,770,940 A | 6/1998 | Goder | |
| 5,898,234 A | 4/1999 | Kitagawa | |
| 5,949,220 A | 9/1999 | Ide et al. | |
| 5,959,853 A | 9/1999 | Kos | |
| 6,064,187 A | 5/2000 | Redl et al. | |
| 6,147,478 A | 11/2000 | Skelton et al. | |
| 6,147,526 A | 11/2000 | Skelton et al. | |
| 6,166,527 A | 12/2000 | Dwelley et al. | |
| 6,246,222 B1 | 6/2001 | Nilles et al. | |
| 6,271,650 B1 | 8/2001 | Massie et al. | |
| 6,307,360 B1 | 10/2001 | Kajiwara et al. | |
| 6,362,607 B1 | 3/2002 | Wickersham et al. | |
| 6,433,525 B2 | 8/2002 | Muratov et al. | |
| 6,456,050 B1 | 9/2002 | Agiman | |
| 6,495,995 B2 | 12/2002 | Groom et al. | |
| 6,583,610 B2 | 6/2003 | Groom et al. | |
| 6,791,306 B2 | 9/2004 | Walters et al. | |
| 6,819,577 B1 | 11/2004 | Wiktor et al. | |
| 6,825,644 B2 | 11/2004 | Kernahan et al. | |
| 6,841,983 B2 | 1/2005 | Thomas | |
| 6,922,044 B2 | 7/2005 | Walters et al. | |
| 7,019,502 B2 | 3/2006 | Walters et al. | |
| 7,106,036 B1 | 9/2006 | Collins | |
| 7,116,568 B1 | 10/2006 | Birchenough | |
| 7,132,820 B2 | 11/2006 | Walters et al. | |
| 7,193,396 B2 | 3/2007 | Orr | |
| 7,391,190 B1 | 6/2008 | Rajagopalan | |
| 7,394,231 B2 | 7/2008 | Flatness et al. | |
| 7,432,689 B2 | 10/2008 | Miller et al. | |
| 7,495,419 B1 | 2/2009 | Ju | |
| 7,570,033 B1 | 8/2009 | Ju | |
| 7,598,715 B1 | 10/2009 | Hariman et al. | |
| 7,696,735 B2 * | 4/2010 | Oraw et al. | 323/282 |
| 7,737,668 B2 | 6/2010 | Oswald et al. | |
| 7,768,246 B2 | 8/2010 | Huang et al. | |
| 7,786,712 B2 * | 8/2010 | Williams | 323/266 |
| 7,834,608 B2 | 11/2010 | Cheng et al. | |
| 7,932,709 B1 | 4/2011 | Ling | |
| 2001/0035745 A1 | 11/2001 | Muratov et al. | |
| 2003/0057922 A1 | 3/2003 | Odaohhara et al. | |
| 2003/0142519 A1 | 7/2003 | Walters et al. | |
| 2004/0075418 A1 | 4/2004 | Densham et al. | |
| 2004/0090804 A1 | 5/2004 | Lipcsei et al. | |
| 2004/0196095 A1 | 10/2004 | Nonaka | |
| 2005/0212489 A1 | 9/2005 | Denning et al. | |
| 2007/0296383 A1 | 12/2007 | Xu et al. | |
| 2008/0157723 A1 | 7/2008 | Xing et al. | |
| 2008/0239772 A1 | 10/2008 | Oraw et al. | |
| 2009/0102440 A1 | 4/2009 | Coles | |
| 2010/0026263 A1 | 2/2010 | Moussaoui et al. | |
| 2010/0123446 A1 | 5/2010 | Cheng et al. | |
| 2012/0112721 A1 | 5/2012 | Wu et al. | |

FOREIGN PATENT DOCUMENTS

| | | |
|---|---|---|
| EP | 0650250 A1 | 4/1995 |
| EP | 0883051 A1 | 12/1998 |
| EP | 1073187 A2 | 1/2001 |
| FR | 2610149 A1 | 7/1998 |
| WO | WO03065558 | 8/2003 |

OTHER PUBLICATIONS

Oraw, Bradley et al. "Load Adaptive, High Efficiency, Switched Capacitor Intermediate Bus Converter." 29th International Telecommunications Energy Conference, pp. 628-635, 2007.

* cited by examiner

VOLTAGE CONVERTER WITH COMBINED BUCK CONVERTER AND CAPACITIVE VOLTAGE DIVIDER

CROSS-REFERENCE TO RELATED APPLICATIONS

This application claims the benefit of U.S. Provisional Application Ser. No. 60/953,254, filed on Aug. 1, 2007, which is herein incorporated by reference for all intents and purposes. This application also claims the benefit of U.S. Provisional Application Ser. No. 61/058,426, filed on Jun. 3, 2008, which is herein incorporated by reference for all intents and purposes. This application is also related to application entitled "VOLTAGE CONVERTER WITH COMBINED CAPACITIVE VOLTAGE DIVIDER, BUCK CONVERTER AND BATTERY CHARGER" filed concurrently herewith at least one common inventor and which is commonly assigned, which is herein incorporated by reference for all intents and purposes.

DESCRIPTION OF THE RELATED ART

It is often desired or advantageous to reduce an input voltage to lower voltage levels to improve efficiency of an electronic device. For example, the most commonly used AC to DC adapter for a notebook computer converts AC voltage to a DC voltage of approximately 19 Volts (V). For the power system of most existing notebook computers, when the AC to DC adapter is plugged in, the 19V adapter output voltage is provided directly used to downstream converters which generate lower voltage supply levels to provide power to different loads, such as a central processing unit (CPU), graphics processing unit (GPU), memory, etc., in addition to charging the battery. It is difficult, however, to optimize the downstream converters used to generate the various reduced voltage levels needed in the electronic device using a 19V input voltage level. The voltage output from the AC to DC adapter may be reduced, but the current must be increased accordingly to provide the same power level. The increased current capacity increases the physical size of the AC to DC adapter and further increases the gauge of the wires to handle the increased current capacity. The increased output current of the AC to DC adapter reduces efficiency. Efficiency is particularly important for battery-powered electronic devices using a rechargeable battery. Also, if a rechargeable battery is provided, the voltage may not be reduced below that battery voltage in order to ensure sufficient voltage to charge the battery.

SUMMARY OF THE PRESENT INVENTION

A voltage converter according to one embodiment includes a buck converter combined with a capacitive voltage divider. The converter includes four capacitors, a switch circuit, an inductor and a controller. A first capacitor is coupled between a reference node and a first output node which develops a first output voltage. A second capacitor is coupled between an input node and either the reference node or the first output node. The switch circuit couples a third capacitor between the reference and first output nodes in a first state of a PWM signal, and couples the third capacitor between the first output and the input nodes in a second state of the PWM signal. The inductor is coupled to the third capacitor and provides a second output node coupled to the fourth capacitor providing a second output voltage. The controller controls the duty cycle of the PWM signal to regulate the second output voltage to a predetermined level. In another embodiment, a battery and battery charger are included. An external power source may be included for providing the input voltage.

BRIEF DESCRIPTION OF THE DRAWINGS

The benefits, features, and advantages of the present invention will become better understood with regard to the following description, and accompanying drawings in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
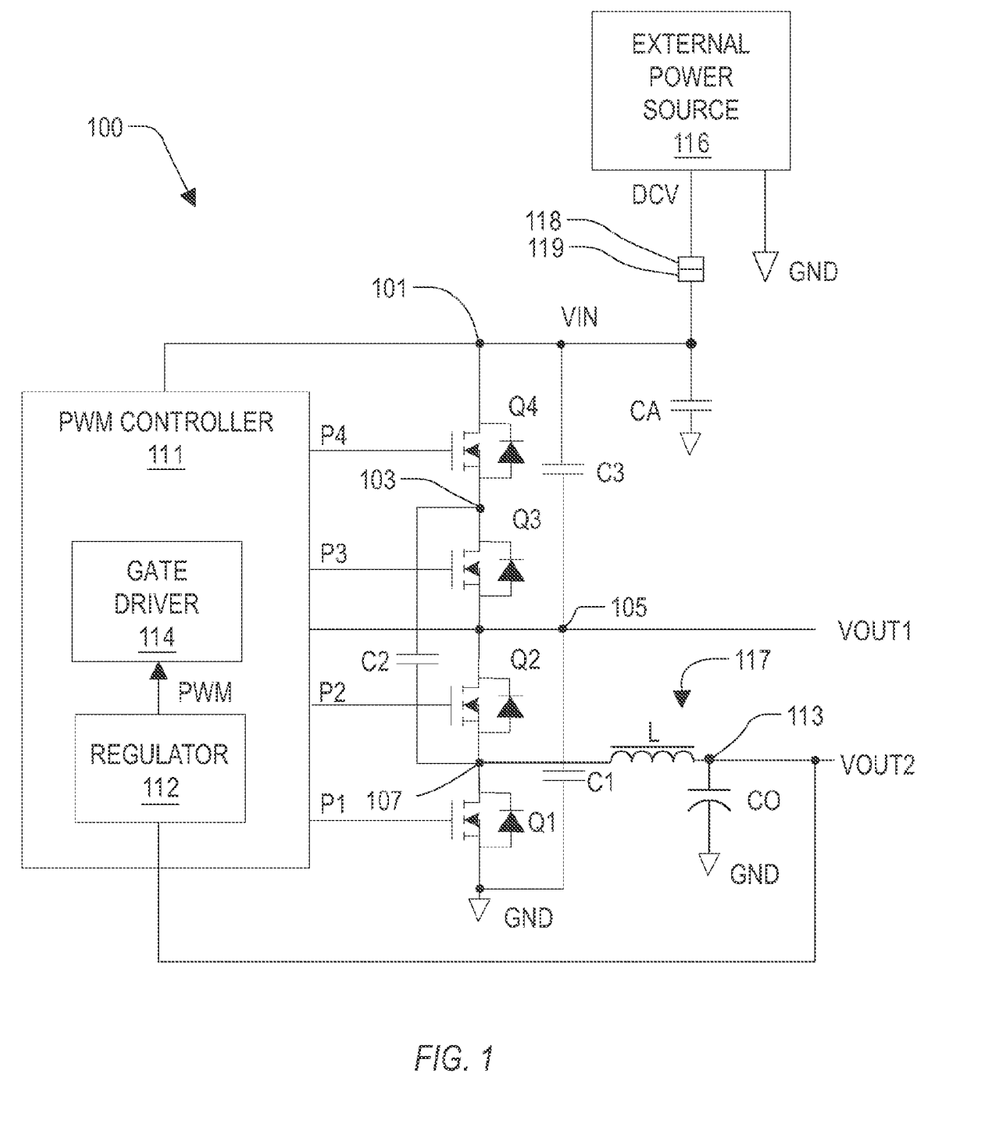
FIG. 1 is a schematic and block diagram of a voltage converter with combined synchronous buck converter and capacitive voltage divider according to an exemplary embodiment.

FIG. 1 is a schematic and block diagram of a voltage converter 100 with combined synchronous buck converter 117 and capacitor voltage divider according to an exemplary embodiment. The voltage converter 100 includes four electronic switches Q1, Q2, Q3 and Q4 coupled in series between an input node 101 and a reference node, such as ground (GND). In the illustrated embodiment, the electronic switches Q1-Q4 are each configured as an N-channel metal oxide semiconductor, field-effect transistor (MOSFET), although other types of electronic switches are contemplated, such as P-channel devices, other types of FETs, other types of transistors, etc. Q4 has a drain coupled to the input node 101 and a source coupled to a first intermediate node 103. Q3 has a drain coupled to the intermediate node 103 and a source coupled to a first output node 105 developing an output voltage VOUT1. Q2 has a drain coupled to the output node 105 and a source coupled to a second intermediate node 107. Q1 has a drain coupled to the intermediate node 107 and a source coupled to GND. A first capacitor C1 is coupled between node 105 and GND, a second "fly" capacitor C2 is coupled between the intermediate nodes 103 and 107, a third capacitor C3 is coupled between the input node 101 and node 105, and a fourth capacitor CA is shown coupled between node 101 and GND for filtering the input voltage VIN. A pulse width modulation (PWM) controller 111 provides gate drive signals P1, P2, P3 and P4 to the gates of the switches Q1, Q2, Q3 and Q4, respectively. VIN and VOUT1 are shown provided to respective inputs of the PWM controller 111.

The switches Q1-Q4, and the capacitors C1-C3 as controlled by the PWM controller 111 collectively form a switched capacitor network which divides the voltage of VIN to develop the voltage level of VOUT1. The PWM controller 111 asserts the P1-P4 signals to turn on the switches Q1 and Q3 while turning off the switches Q2 and Q4 during a first portion of each PWM cycle, and then to turn off switches Q1 and Q3 while turning on switches Q2 and Q4 during a second portion of each PWM cycle. The PWM duty cycle D of the switched capacitor network is at or near 50% and the voltage of VOUT1 converges to approximately one-half of the voltage level of VIN, so that the switched capacitor network is also referred to as a capacitor voltage divider. As an example, the switches Q1 and Q3 are toggled on and off approximately 50% of the time and the switches Q2 and Q4 are toggled off and on approximately 50% of the time in the conventional configuration. It is noted, however, that the duty cycle D may deviate from 50% by a relatively significant amount while VOUT1 still remains at approximately half the voltage of VIN. This is advantageous for also allowing regulation of the voltage output of the included synchronous buck regulator 117 as described below.

The voltage converter 100 further includes an inductor L having one terminal coupled to the intermediate node 107 and another terminal coupled to a second output node 113 developing a second output voltage VOUT2. An output filter capacitor CO is coupled between the output node 113 and GND. It is appreciated that different types of ground nodes may be used, such as signal ground, power ground, chassis ground, etc., although the same notation "GND" is used for each. The capacitor CO and inductor L collectively form an inductor-capacitor (LC) circuit coupled to the intermediate node 107. The switches Q1 and Q2, the inductor L and the capacitor CO as controlled by the PWM controller 111 collectively form the synchronous buck regulator 117. The voltage VOUT1 provides the input voltage for the buck regulator 117 used to develop the voltage level of VOUT2. The PWM controller 111 toggles activation of the Q1-Q4 switches to regulate VOUT2 to the predetermined voltage developing the duty cycle D such that VOUT2=D*VOUT1, where an asterisk "*" denotes multiplication. In the illustrated embodiment, VOUT2 is fed back to a regulator 112 within the PWM controller 111, which provides a PWM signal to a gate driver circuit 114. The gate driver circuit 114 converts the PWM signal to the gate drive signals P1-P4 to control operation of the switches Q1-Q4, respectively.

An external power source 116 provides a power source voltage DCV which is used to source the input voltage VIN to node 101. In the illustrated embodiment, the external power source 116 is removable and coupled using compatible mating connectors 118 and 119 which are adapted to mechanically and electrically interface each other for conveying the power source voltage DCV to the voltage converter 100. Although not specifically shown, the connectors 118 and 119 typically convey the GND signal as well.

In operation, the voltage level of VOUT2 is regulated by the regulator 112 of the PWM controller 111 to a predetermined voltage level. In particular, the regulator 112 senses or detects the voltage level of VOUT2, either directly, such as via a feedback circuit (not shown) or by other means or indirectly (e.g., such as via the intermediate node 107 or the like), and controls the duty cycle D of the PWM signal, and the gate driver 114 in turn controls the P1 and P2 signals based on the PWM duty cycle D to control the switches Q1 and Q2 to regulate the voltage level of VOUT2 to the predetermined voltage level. Furthermore, in the illustrated embodiment, the P1 signal is "copied" or made the same as the P3 signal and the P2 signal is made the same as the P4 signal, or P1=P3 and P2=P4. In one embodiment, for example, the signal lines P1 and P3 are directly coupled or connected together and the signal lines P2 and P4 are directly coupled or connected together. Alternatively, the P1 signal is selectively buffered to provide the P3 signal and the P2 signal is selectively buffered to provide the P4 signal. In this manner, the PWM controller 111 controls the P1 and P2 signals to regulate the voltage level of VOUT2 according to buck regulator operation, and the signals P1 and P2 are copied to the signals P3 and P4, respectively, for capacitor voltage divider operation.

The process of accomplishing the capacitor voltage divider function is described as follows. When Q2 and Q4 are turned on while Q1 and Q3 are turned off, the capacitor C2 is coupled between VIN and VOUT1 and thus is charged such that VC1+VC2=VIN where VC1 and VC2 are the voltages of the capacitors C1 and C2, respectively. When Q2 and Q4 are turned off while Q1 and Q3 are turned on, the capacitor C2 is coupled between VOUT1 and GND and thus is discharged so that VC1=VC2. As this process repeats at a suitable frequency, both equations VC1+VC2=VIN and VC1=VC2 are satisfied so that VC1=VC2=½ VIN. The most efficient duty cycle D for the capacitor voltage divider is approximately 50%. Nonetheless, the voltage converter 100 still operates with high efficiency when the duty cycle D deviates from 50%, such as at least between a range of 40%-60%. In this manner, in spite of relatively significant deviation of the duty cycle D from 50%, VOUT1 remains at about one-half the voltage of VIN whereas VOUT2 is regulated to a desired voltage level which does not have to be exactly one-half of VOUT1. The capacitor C2 thus operates as a fly capacitor which is toggled between the nodes 101 and 105 in one state of the PWM signal and between node 105 and GND in another state of the PWM signal to respectively charge and discharge the fly capacitor.

The capacitor voltage divider of the voltage converter 100 provides higher efficiency for sourcing power via VOUT1 as compared to conventional buck converter type configurations. The capacitor voltage divider output at VOUT1 does not have an inductor, so that there is no inductor core loss and winding copper loss. The capacitor voltage divider switches Q1-Q4 (e.g., MOSFETs) operate with zero voltage turn-off, and each switch sees only half of VIN so that total switching loss is relatively low. In a normal buck converter, the switches are exposed to the total input voltage VIN and thus have higher switching losses. Furthermore, since the conduction loss of the electronic switches is dominant as compared to other losses, the conduction losses may be reduced by reducing the on-resistance of the switches without the normal concern of increasing the switching loss. For example, on-resistance may be reduced by coupling multiple switches in parallel. When this is attempted for a conventional buck converter configuration, when RDSON (drain to source resistance when turned on) is reduced by increasing the switch silicon die area, the control terminal charge (e.g., gate charge) increases accordingly. As result, the increase of switching loss in a conventional buck converter offsets the reductions of the conduction loss by lowering RDSON. Another benefit of this configuration is that the external power source 116 may be made physically smaller by providing higher voltage and less current to deliver the same amount of power as compared to another adapter which provides less voltage at a higher current level.

In one embodiment, VIN is approximately 19 Volts (V), VOUT1 is approximately 9.5V, and VOUT2 is approximately 5V. The duty cycle D of the PWM signal, and thus the P1 and P2 signals, is approximately 53% to convert the "input" voltage level of 9.5V to the regulated voltage of 5V for the buck converter 117. The duty cycle D varies somewhat depending upon load conditions or the like. Since the duty cycle D used for the switches Q1 and Q2 is duplicated and used as the duty cycle for the switches Q3 and Q4, this same duty cycle D is used for the capacitor voltage divider. Although the duty cycle D varies somewhat from 53%, it remains sufficiently close to the 50% level. In any event, VOUT1 remains at approximately half of VIN while VOUT2 is regulated to 5V even for significant deviations of the duty cycle D from 50%.

In another embodiment, VIN is approximately 20V, VOUT1 is approximately 10V, and VOUT2 is approximately 5V. The duty cycle D in this case is approximately 50%. Nonetheless, the PWM controller 111 controls the duty cycle D of the switches Q1 and Q2 to regulate VOUT2 to 5V and the same duty cycle D is duplicated to the switches Q3 and Q4 as previously described. It is further noted that the capacitors C1, C3 and CA form a capacitor loop which enables alternative embodiments in which either one of the capacitors CA and C3 may be omitted. In one embodiment, VIN provides the initial voltage source for providing power to the PWM controller 111 and VOUT2 is used to provide power once regulation is achieved. In this case, VOUT2 is not sensed but is provided directly to the PWM controller 111.

Figure 2:
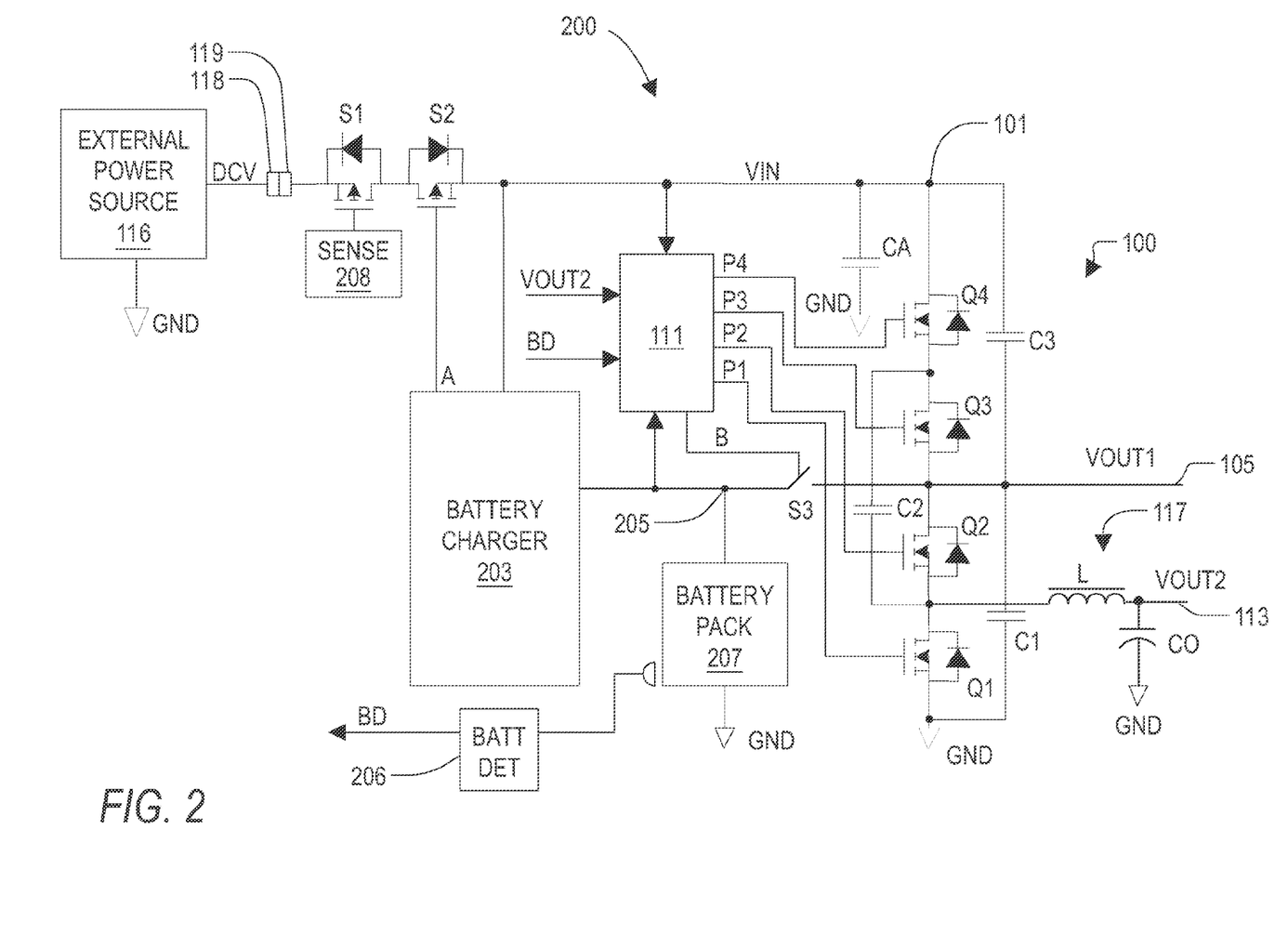
FIG. 2 is a schematic and block diagram of a power circuit including the voltage converter of FIG. 1.

FIG. 2 is a schematic and block diagram of a power circuit 200 including the voltage converter 100. The voltage converter 100 is configured in substantially similar manner as shown in FIG. 1 in which the PWM controller 111 receives the VOUT1 and VOUT2 voltages and provides the control signals P1-P4 to the gates of switches Q1-Q4, respectively. Capacitors C1-C3 and CA are included and coupled in the same manner. As previously described, however, either one or both of the capacitors C3 and CA may be included to complete the capacitor loop. Operation is substantially similar in which the PWM controller 111 controls the duty cycle D of the switches Q1 and Q2 to regulate the voltage of VOUT2 and VOUT1 is developed using capacitive switching action by switchably coupling the fly capacitor C2 between nodes 101 and 105 or between node 105 and GND. In the illustrated embodiment, the output of the external power source 116 provides the power source voltage DCV through the connectors 118 and 119 and through a pair of isolation switches S1 and S2 to the node 101 developing the VIN signal. The isolation switches S1 and S2 are provided to selectively couple power from the external power source 116 to the power circuit 200 as further described below. A sense circuit 208 controls operation of the switch S1. The node 101 is further coupled to the input of a battery charger 203, having an output at a node 205 which is further coupled to a terminal of a rechargeable battery pack 207. A switch S3 is coupled between nodes 205 and 105 for selectively coupling the battery pack 207 to drive VOUT1 depending upon the mode of operation. A battery detect circuit 206 detects the presence of the battery pack 207 and asserts a battery detect signal BD indicative thereof to the PWM controller 111. The PWM controller 111 determines the mode of operation, including either external power mode or battery power mode, and asserts a signal B to control the switch S3.

The isolation switches S1 and S2 are shown as P-channel MOSFETs, although other types of electronic switches are contemplated, such as other types of FETs or other transistor types and the like. The switches S1 and S2 are shown coupled in a common drain back-to-back configuration. When the external power source 116 is initially connected via the connectors 118 and 119, the sense circuit 208 detects the DCV voltage and slowly turns on the switch S1 to avoid significant in-rush current. In one embodiment, the sense circuit 208 includes a resistor-capacitor (RC) circuit or the like for sensing external power. While the switch S1 is turning on, the internal diode of the switch S2 is forward biased and the battery charger 203 detects the presence of external power via node 101. In the illustrated embodiment, the battery charger 203 asserts a signal A to turn on the switch S2 so that DCV sources VIN for external power mode. When the external power source is no longer available, the battery charger 203 turns off the switch S2 for isolation. The PWM controller 111 detects the presence of DCV via node 101 and the battery pack 207 via the BD signal and determines the operating mode. In battery power mode, the PWM controller 111 turns on the switch S3 via the B signal and in external power mode, the PWM controller 111 turns off the switch S3. If in battery power mode upon power up, the PWM circuit 111 may initially derive power from the battery pack 207 via node 205. As previously described, once regulation of VOUT2 is achieved and if provided directly to the PWM controller 111 as shown, then VOUT2 provides power to the PWM controller 111 during normal operation. The switch S3 is shown in simplified form, but it may be implemented as transistors as well, such as FETs or MOSFETs or the like.

In one embodiment, the battery pack 207 includes a stack of three Lithium-ion (Li-ion) batteries having a battery voltage ranging from 8.4V to 12.6V. Other battery configurations and voltages are contemplated (including non-rechargeable batteries in certain configurations). Although not shown, the battery charger 203 includes a separate buck converter or the like for converting the power source voltage DCV to charge voltage and current for charging the battery pack 207. The battery pack 207 includes one or more battery cells and is coupled between node 205 and GND. Since the battery pack 207 provides an alternative source of power, the external power source 116 is selectively removable.

When the external power source 116 is available to provide the power source voltage DCV, the switches S1 and S2 are turned on to provide power to develop the voltage VIN on node 101. The switch S3 is opened and the battery charger 203 charges the battery pack 207. As noted above, the voltage converter 100 operates in a similar manner as previously described in which the PWM controller 111 controls the P1-P4 signals to regulate the voltage of VOUT2 to a predetermined voltage level and also to operate the capacitor voltage divider for developing the voltage of VOUT1 as approximately half the voltage of VIN. When the external power source 116 is not available, the switches S1 and S2 are opened or turned off to disconnect the battery charger 203, and the switch S3 is closed or turned on so that the voltage of the battery pack 207 is provided to VOUT1 as the primary voltage source. In this case, the PWM controller 111 controls only the switches Q1 and Q2 (via signals P1 and P2, respectively) to regulate the voltage of VOUT2 as previously described, and the P3 and P4 signals are not asserted to keep the switches Q3 and Q4 off. It is noted that the battery pack 207 may have a relatively wide voltage range (e.g., 8V-17V), so that the duty cycle D of the switches Q1 and Q2 may have a significantly wider duty cycle range (as compared to when external power is available) in order to regulate VOUT2 to the desired voltage level. In this case, however, the switches Q3 and Q4 remain off and are not activated.

The capacitor voltage divider of the power circuit 200 provides higher efficiency for sourcing power via VOUT1 as compared to conventional buck converter type configurations in a similar manner as described above for the voltage converter 100. Again, the capacitor voltage divider output at VOUT1 does not have an inductor, so that there is no inductor core loss and winding copper loss. The capacitor voltage divider switches Q1-Q4 operate with zero voltage turn-off, and each switch sees only half of VIN so that total switching loss is relatively low. Furthermore, since the conduction loss of the electronic switches is dominant as compared to other losses, the conduction losses may be reduced by reducing the on-resistance (RDSON) of the switches (e.g., coupling multiple switches in parallel to reduce combined on-resistance) without the normal concern of increasing the switching loss. Another benefit of this configuration is that existing AC to DC adapters (e.g., 19V notebook computer adapter) may be used as the external power source 116 in which the higher adapter output voltage is reduced to achieve higher efficiency operation.

Figure 3:
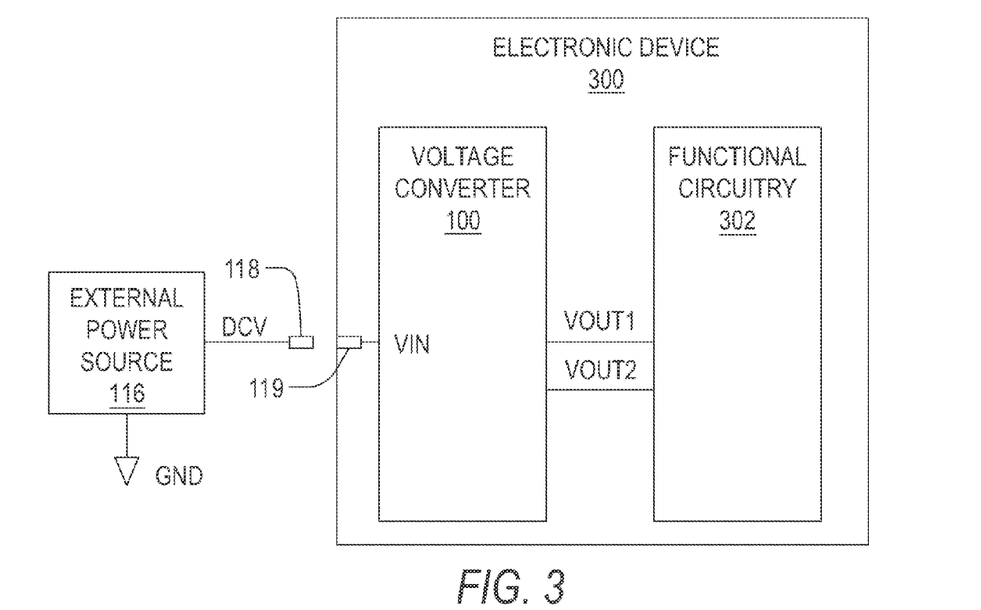
FIG. 3 is a simplified block diagram of an electronic device incorporating the voltage converter of FIG. 1.

FIG. 3 is a simplified block diagram of an electronic device 300 incorporating the voltage converter 100. The electronic device 300 includes the voltage converter 100 which receives power from the external power source 116 and a functional circuitry 302 which receives power from the voltage converter 100. The functional circuitry 302 represents the primary circuitry performing the primary functions of the electronic device 300. The external power source 116 provides the power source voltage DCV via the connectors 118 and 119 in which connector 119 is shown mounted on the electronic device 300. When connected, the power source voltage DCV sources the input voltage VIN to the voltage converter 100 via the connectors 118 and 119 as understood by those skilled in the art. The voltage converter 100 provides the VOUT1 and VOUT2 output voltages to the functional circuitry 302 when the external power source 116 is available to provide power. In this case, the external power source 116 is the sole source of power.

The electronic device 300 represents any type of small electronic device dependent upon an external power source. In one embodiment, the electronic device 300 is an AC powered unit or the like in which the external power source 116 is an AC to DC adapter for plugging into an AC socket (not shown). In another embodiment, the electronic device 300 is used with an automobile in which the external power source 116 is an automobile adapter which plugs into an available 12VDC source (e.g., cigarette lighter). In either case, the external power source 116 provides DCV at a higher voltage level than either of the desired output voltage levels VOUT1 or VOUT2. The voltage converter 100 converts the higher input voltage to the lower output voltage levels VOUT1 and VOUT2 suitable for the functional circuitry 302 of the electronic device 300 with relatively high efficiency.

Figure 4:
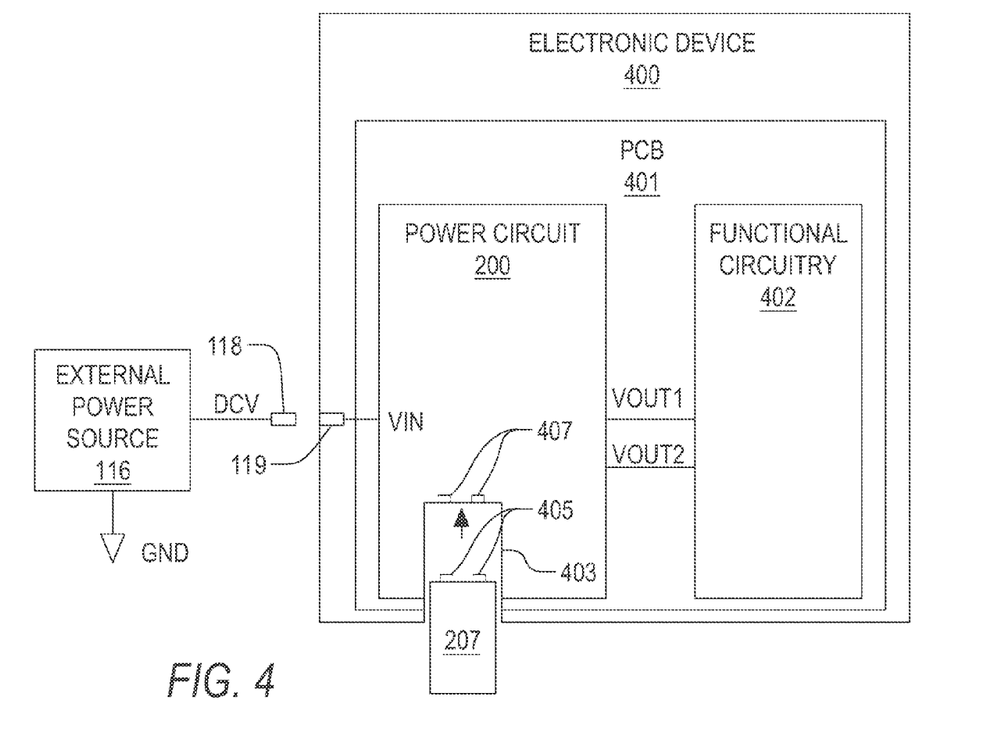
FIG. 4 is a simplified block diagram of an electronic device incorporating the power circuit of FIG. 2.

FIG. 4 is a simplified block diagram of an electronic device 400 incorporating the power circuit 200 and a functional circuitry 402. The power circuit 200 and the functional circuitry 402 are shown mounted on a printed circuit board (PCB) 401 within the electronic device 400. The functional circuitry 402 represents the primary circuitry performing the primary functions of the electronic device 400. If the electronic device 400 is a computer system, such as a notebook computer or the like, then the PCB 401 represents the motherboard or other suitable PCB within the computer. A battery slot 403 is provided for receiving and holding the battery pack 207 as understood by those skilled in the art. The battery pack 207 has several terminals 405 for electrically interfacing corresponding battery nodes 407 when the battery pack 207 is inserted into the slot 403. At least one of the nodes 407 is coupled to the battery node 205 for receiving charge current or for sourcing power from the battery (or batteries) as previously described. The illustrated depiction is simplified and not intended to be limited to the configuration shown; any type of battery interface is contemplated. In one embodiment, the battery pack 207 is rechargeable as previously described.

In an alternative embodiment, the battery pack 207 is not rechargeable but is simply a replaceable battery pack as understood by those skilled in the art. If not rechargeable, then the battery charger 203 is either not provided or is otherwise configured to detect battery type and not perform recharging functions. Also, the battery pack 207 may alternatively be integrated into the electronic device 400 rather than being removable via an external access (e.g., integrated battery configuration of MP3 or media players and the like).

The electronic device 400 includes a similar connector 119 for interfacing the connector 118 of the external power source 116 to provide the power source voltage DCV in a similar manner as described for the electronic device 300. In one embodiment, the external power source 116 is an AC to DC adapter. When connected, the power source voltage DCV sources the input voltage VIN to the power circuit 200 via the connectors 118 and 119 as understood by those skilled in the art for providing power and/or for charging the battery pack 207. The power circuit 200 provides the VOUT1 and VOUT2 output voltages as previously described for providing power to the functional circuitry 402 of the electronic device 400. If the external power source 116 is not available, then the battery pack 207 provides power if sufficiently charged.

The electronic device 400 represents any type of battery-powered electronic device, including mobile, portable, or handheld devices, such as, for example, any type of personal digital assistant (PDA), personal computer (PC), portable computer, laptop computer, notebook computer, etc., cellular phone, personal media device, MP3 player, portable media player, etc. The power circuit 200 is particularly advantageous for providing the source voltages of a notebook computer or the like. In one embodiment, a common voltage level for notebook computers is 19V used to provide power for charging a notebook battery. As shown, if VIN (or DCV) is 1 gV, it is useful for charging the battery pack 207 having a voltage range up to 17V. Many downstream voltage converters (not shown), however, operate less efficiently with a higher voltage level such as 19V. The capacitor voltage divider function employing the switches Q1-Q4 and the capacitors C1-C3 (and/or capacitor CA) provide a stepped-down voltage level for VOUT1 of 9.5V or approximately half the voltage of VIN. The voltage level of 9.5V is more suitable to provide power to converters providing power to main computer devices, such as a central processing unit (CPU, not shown), a graphics processing unit (GPU, not shown), memory devices (not shown), etc. Furthermore, the buck converter 117 is useful to convert the voltage of VOUT1 (e.g., 9.5V) to a more suitable voltage level for other computer components, such as 5V useful for providing power to a hard disk drive (HDD) controller (not shown), a universal serial bus (USB, not shown), etc.

The power circuit 200 including the voltage converter 100 provides the useful voltage levels for many electronic devices, including computers and the like, while also providing improved overall system efficiency as compared to existing power circuits. The capacitor voltage divider portion of the voltage converter 100 provides the higher voltage levels (e.g., 19V, 9.5V), whereas the combination buck converter at the lower half of the switched capacitor circuit provides the useful regulated voltage level (e.g., 5V) for other device components. Furthermore, the external power source 116 can be made physically smaller since it is providing a higher voltage level at reduced current as previously described.

Figure 5:
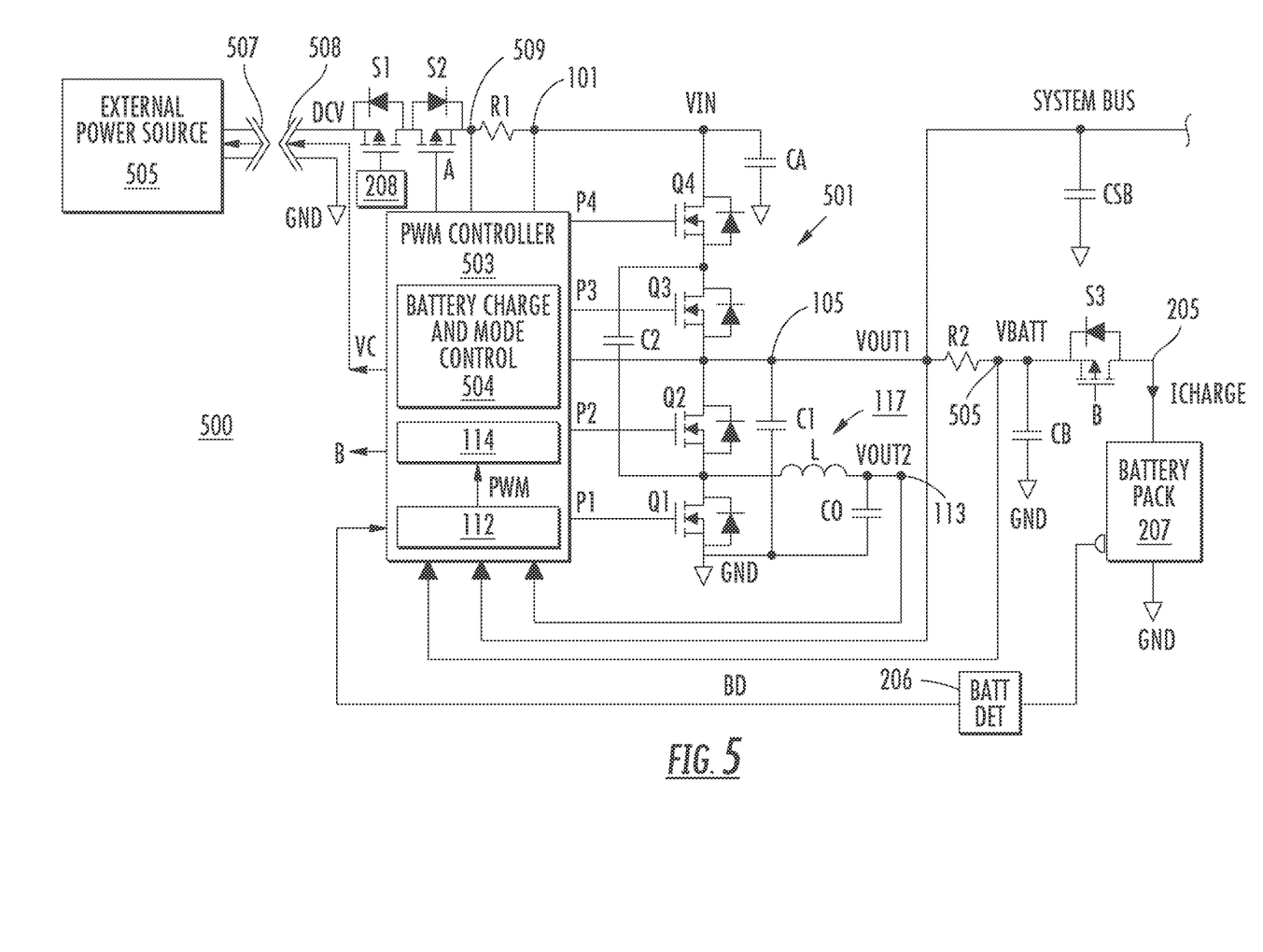
FIG. 5 is a schematic and block diagram of another power circuit including a voltage converter and including combined battery charger functions.

FIG. 5 is a schematic and block diagram of another power circuit 500 including a voltage converter 501 and including combined battery charger functions. The voltage converter 501 is similar to the voltage converter 100 and includes electronic switches Q1-Q4, the capacitors C0, C1, C2, CA, and the inductor L coupled in substantially the same manner. The capacitor C3 is omitted in the illustrated embodiment. Because the capacitors C1, C3 and CA would otherwise form a capacitor loop structure as previously described, the switched capacitor operation and function is substantially similar when either one or both of the capacitors C3 and CA are included. The PWM controller 111 is replaced with a PWM controller 503 which incorporates PWM control and battery charge control functions as further described herein. As shown, for example, the PWM controller 503 includes the regulator 112 and the gate driver circuit 114 in which the regulator 112 senses and regulates VOUT2 and provides PWM to the gate driver circuit 114 which generates the drive signals P1-P4 in a similar manner as previously described. The PWM controller 503 further includes a battery charge and mode control circuit 504 for controlling battery charging, operation mode and other control functions of the power circuit 500. The switches Q1 and Q2, the inductor L and the capacitor C0 as controlled by the PWM controller 503 collectively form the synchronous buck regulator 117 which is combined with the switched capacitor function in a similar manner as previously described. The battery detect circuit 206 is shown for sensing connection of the battery pack 207 and for asserting the battery detect signal BD to the PWM controller 503 in a similar manner as previously described.

The external power source 116 is replaced with another external power source 505 which is coupled via compatible mating connectors 507 and 508. The external power source 505 includes three terminals including a GND terminal and the power terminal providing DCV in similar manner as the external power source 116, but further includes a control input for receiving a voltage control (VC) signal from the PWM controller 503. As further described below, the PWM controller 503 asserts the VC signal to cause the external power source 505 to adjust the voltage level of the power source voltage DCV, which in turn adjusts the voltage levels of VIN and VOUT1. The power source voltage DCV is provided through the isolation switches S1 and S2 having current terminals coupled in series between DCV and a node 509. The switch S1 is controlled by the sense circuit 208 in a similar manner as previously described. The switch S2 is controlled by a signal A provided from the PWM controller 503. The switches S1 and S2 are shown as P-channel MOSFETs (although other types of electronic switches may be used) and operate in substantially the same manner as described for the power circuit 200. A current sense resistor R1 is coupled between nodes 101 and 509 and both nodes 101 and 509 are coupled to corresponding inputs of the PWM controller 503.

The output node 105 which develops VOUT1 also forms a SYSTEM BUS node for providing a higher voltage supply to electronic circuits in a similar manner previously described. A filter capacitor CSB is coupled between the SYSTEM BUS node and GND for filtering the SYSTEM BUS node. A battery charge current sense resistor R2 is coupled between node 105 and a node 505 which develops a battery voltage VBATT when the battery pack 207 is connected. The charge current through the battery pack 207 is shown as ICHARGE. A switch S3 (also shown as a P-channel MOSFET in which other switch types are contemplated) has current terminals coupled between node 505 and the node 205 coupled to a terminal of the battery pack 207. The switch is controlled by a signal B provided from the PWM controller 503. A filter capacitor CB is coupled between node 505 and GND for filtering VBATT. The output nodes 105 and 113 and the node 505 are coupled to corresponding inputs of the PWM controller 503. In this case, the PWM controller 503 asserts control signals A and B for controlling the switches S2 and S3, respectively. The electrical path from node 105 through R2 to node 505 and through switch S3 and through node 205 and the battery pack 207 to GND is referred to as a battery charge path. The resistor R2 is a sense resistor in which the PWM controller 503 senses voltage across R2 to measure ICHARGE. Alternative current sense techniques are known and contemplated.

In this case, the PWM controller 503 incorporates the PWM control functions of the PWM controller 111 and the battery charge control functions described for the battery charger 203. The PWM controller 503 does not, however, include a separate battery charger. Instead, the output of the capacitor voltage divider is employed to charge the battery pack 207 via VOUT1 at node 105. This provides a significant advantage by eliminating a separate battery charger and corresponding circuitry. The PWM controller 503 monitors the voltage of VOUT2 via node 113 and regulates the voltage of VOUT2 at a predetermined voltage level by controlling the duty cycle D (switching of Q1/Q3 and Q2/Q4) in a similar manner as previously described for the voltage regulator 100 and the power circuit 200. The PWM controller 503 monitors the voltage of VIN and the current provided to node 101 via the external power source 505 by monitoring the voltage across the current sense resistor R1. The PWM controller 503 further monitors the voltage of VOUT1 via node 105, the battery voltage VBATT via node 505, and the battery charge current ICHARGE via the voltage across current sense resistor R2 (or voltage difference between VOUT1 and VBATT). The PWM controller 503 further controls the voltage level of the DCV signal via the voltage control signal VC.

The battery pack 207 has a normal battery voltage range between a minimum battery voltage and a maximum battery voltage. It is understood, however, that rechargeable batteries may become deeply discharged and may have a voltage which is less than the normal minimum battery voltage. Nonetheless, it is still desired to charge a deeply discharged battery. If the switch S3 were to be turned fully on when the voltage of the battery pack 207 is below the minimum battery voltage level, then the voltage of VOUT1 (and the SYSTEM BUS) may be pulled below the minimum level causing undesired results (such as potentially causing failure of an electronic device being powered by the power circuit 500). Instead, the switch S3 is controlled by the PWM controller 503 in its linear range to provide a trickle charge (or a relatively low current or "trickle" current level) while also allowing VOUT1 to be above the actual battery voltage during a trickle charge mode. In particular, the PWM controller 503 asserts the VC signal to cause the external power source 505 to assert DCV at twice the minimum voltage level, which corresponds with twice the normal minimum battery voltage. The switches S1 and S2 are turned on so that VIN also has a voltage level of twice the minimum voltage level. Because of the capacitor voltage dividing function of the capacitors C1, C2 and CA switched by electronic switches Q1-Q4, VOUT1 becomes one-half the voltage of VIN, which is the normal minimum battery voltage level. Thus, VOUT1 is maintained at the minimum battery voltage level even thought VBATT is below the minimum during the trickle charge mode. It is noted that the trickle charge current is not necessarily constant. In one embodiment, the trickle charge current level rises as the battery voltage rises towards the minimum battery voltage level. The duty cycle D of the PWM controller 503, however, is whatever value is needed to maintain VOUT2 at its regulated voltage level.

When the voltage of the battery pack 207 rises to its minimum voltage level (as a result of trickle charging), the PWM controller 503 switches to a constant current charge mode to deliver a relatively high constant current to charge the battery pack 207 at a faster rate. In the constant current charge mode, the PWM controller 503 monitors ICHARGE and VBATT and regulates the voltage level of VIN via the voltage control signal VC to maintain ICHARGE at the constant charge current level. VOUT1 is between the minimum and maximum battery voltage levels while the battery pack 107 is charged with constant current. As the voltage of VBATT rises during constant current charge mode, the switching duty cycle D decreases to maintain VOUT2 at its regulated level whereas VOUT1 rises. When VBATT reaches the maximum battery voltage level, the PWM controller 503 switches to a constant voltage charge mode in which the PWM controller 503 controls the voltage of DCV to maintain VBATT at a constant level (which is the maximum battery voltage level). It is appreciated that when VBATT reaches its maximum level, the charge current changes (e.g., decreases) to whatever value necessary to maintain VBATT constant.

In one exemplary embodiment, the normal voltage range of the battery pack 207, as measured at VBATT, is between a minimum voltage level of 8.4V and a maximum voltage level of 12.6V. Also, the nominal or target level for VOUT2 is approximately 5V. In this case, when VBATT is at or below 8.4V in the trickle charge mode, the PWM controller 503 controls DCV to twice the minimum level or about 16.8V so that VOUT1 is about 8.4V or slightly higher. The PWM controller 503 also regulates VOUT2 at 5V so that the duty cycle D is approximately 60%. When VBATT is between 8.4 and 12.6V in the constant current charge mode, the PWM controller 503 controls the voltage of DCV to maintain the constant charge current level of ICHARGE. Since VBATT normally rises during the constant current charge mode, the PWM controller 503 increases DCV and decreases the duty cycle D by a suitable amount to maintain VOUT2 at 5V. When VBATT reaches its maximum level of 12.6V for the constant voltage charge mode, the PWM controller 503 controls DCV to maintain VBATT at 12.6V. Generally, DCV is maintained at about twice the battery voltage or at about 25.2V. Since VOUT1 is maintained at about 12.6V or slightly above during constant voltage mode, then the duty cycle D drops to about 40% to maintain VOUT2 at 5V. In this manner, the duty cycle D ranges between 40%-60% during the trickle, constant current and constant voltage battery charge modes. Although the most efficient duty cycle for the capacitor voltage divider is at 50% (when DCV is 20V and VOUT1 is 10V), the overall efficiency remains relatively high even within the duty cycle range of 40%-60%.

The PWM controller 503 detects DCV and controls the switch S2 in a similar manner as previously described for the battery charger 203, and the PWM controller 503 detects the battery pack 207 via the BD signal in a similar manner as previously described for the PWM controller 111. The PWM controller 503 controls the mode of operation between external power mode and battery power mode and controls battery charging functions when the external power source 505 and the battery pack 207 are both detected. If the external power source 505 is providing power and the battery pack 207 is not connected, then it is possible to command the voltage level of VIN to the appropriate level for 50% duty cycle of the PWM signal so that VOUT1 is less than the voltage of a fully charged battery. Such would theoretically provide maximum efficiency of the capacitor voltage divider. If a fully charged battery pack 207 is coupled to node 205 while VOUT1 is less than the battery voltage, however, the internal diode of the switch S3 is forward biased causing temporary contention which may otherwise be quickly resolved by the PWM controller 503.

In one embodiment, when the when the external power source 505 provides DCV and the battery pack 207 is not detected, then the PWM controller 503 commands DCV to the maximum battery voltage level rather than whatever level achieves 50% duty cycle. If the battery pack 207 is subsequently detected, then the PWM controller 503 begins turning on switch S3 while monitoring the voltage of VBATT and adjusts VIN accordingly via the VC signal to transition to the appropriate voltage level and battery charging mode (one of trickle charge mode, constant current charge mode, or constant voltage charge modes previously described). It is noted that although operating at the maximum battery voltage level without the battery pack 207 is not necessarily optimal switching efficiency for the switched capacitor circuit (e.g., at 40% rather than 50%), several benefits are achieved. First, battery coupling issues with a fully charged battery are avoided. Second, the external power source 505 operates at a higher voltage level and reduced current level for sourcing external power at the same power level, achieving higher operating efficiency. Third, operating VOUT1 at higher voltage and reduced current for delivering the same power level also achieves higher operating efficiency for the adapter.

The PWM controller 503 charges the battery pack 207 at a predetermined default current level (e.g., 4 Amperes or "A") during constant current charge mode. In an alternative embodiment, the battery detect circuit 206 is replaced with a smart battery detect circuit (not shown) for interfacing 'dumb' or 'smart' battery packs. If the smart battery detect circuit senses a regular or dumb battery pack, then operation remains unchanged. If a smart battery pack is detected, then the smart battery detect circuit conveys particular charging information from the smart battery pack to the PWM controller 503 for determining particular charging current and/or voltage levels as understood by those skilled in the art. For example, a smart battery pack may command a constant current charge of 3.8 A and a maximum voltage of 25V.

The capacitor voltage divider of the power circuit 500 provides higher efficiency for sourcing power via VOUT1 as compared to conventional buck converter type configurations in a similar manner as described above for the power circuit 200. Again, the capacitor voltage divider output at VOUT1 does not have an inductor, so that there is no inductor core loss and winding copper loss. The capacitor voltage divider switches Q1-Q4 operate with zero voltage turn-off, and each switch is exposed to only one-half of VIN so that total switching loss is relatively low. Furthermore, since the conduction loss of the electronic switches is dominant as compared to other losses, the conduction losses may be reduced by reducing the on-resistance of the switches without the normal concern of increasing the switching loss (e.g., by coupling multiple switches in parallel to reduce on-resistance). Another benefit of this configuration is that the external power source 505 may be made physically smaller by providing higher voltage and less current to deliver the same amount of power as compared to another adapter which provides less voltage at a higher current level.

The power system 500 provides additional advantages and benefits. The battery charge control and the VOUT2 PWM control are integrated into a single controller. The PWM controller 503 generates the duty cycle D based on the voltages of VOUT1 and VOUT2. The PWM controller 503 generates the VC signal sending back to the external power source 505 based on the battery charging conditions. The power stage components are reduced to lower the overall system cost and increase the power density. The additional battery charger (battery charger 203) is eliminated which eliminates an additional inductor from the circuit. Instead, the efficient VOUT1 output sourcing the SYSTEM BUS is used to charge the battery pack 207.

Figure 6:
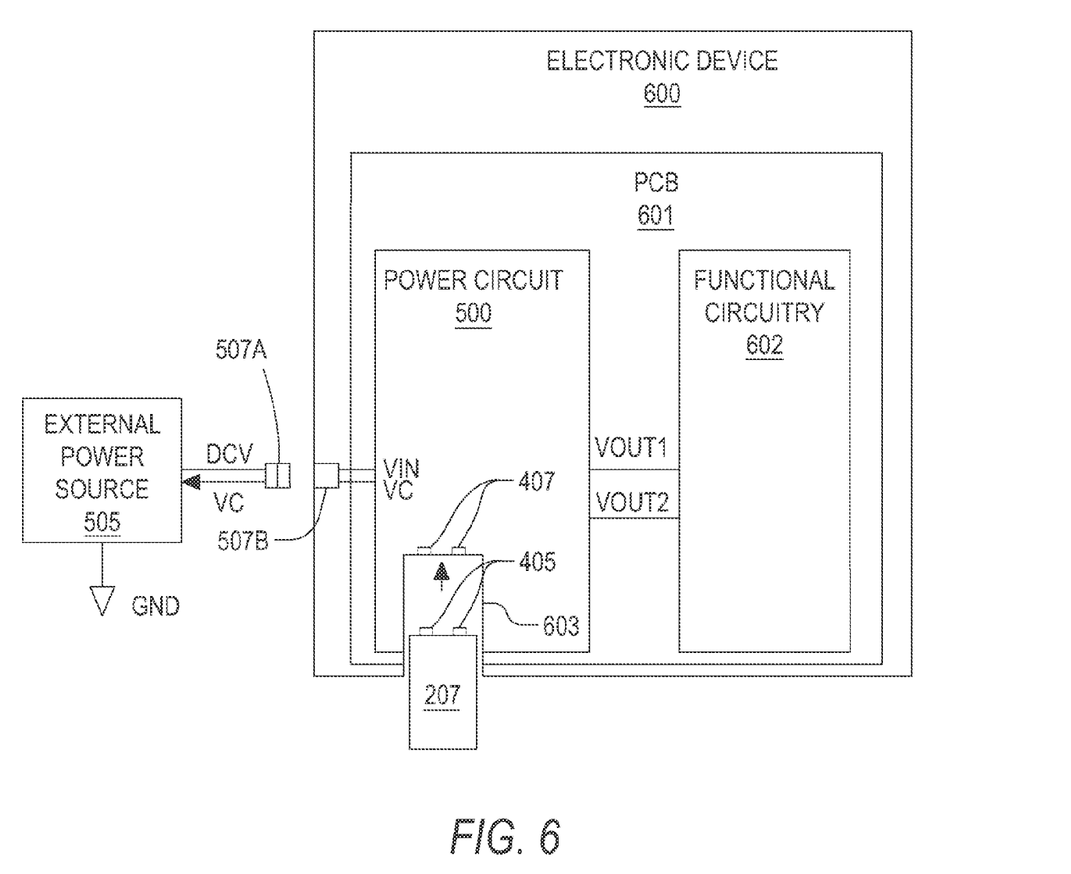
FIG. 6 is a simplified block diagram of an electronic device incorporating the power circuit of FIG. 5.

FIG. 6 is a simplified block diagram of an electronic device 600 incorporating the power circuit 500 and a functional circuitry 602. The power circuit 500 and the functional circuitry 602 are shown mounted on a PCB 601 within the electronic device 600 in a similar manner as described for the electronic device 400. The functional circuitry 602 represents the primary circuitry performing the primary functions of the electronic device 600. If the electronic device 600 is a computer system, such as a notebook computer, then the PCB 601 may represent the motherboard or other similar PCB within the computer. The electronic device 600 includes a similar battery slot 603 for receiving and holding the battery pack 207, which includes similar terminals 405 for electrically interfacing corresponding battery nodes 407 when the battery pack 207 is inserted into the slot 603 in a similar manner as described for the electronic device 400. At least one of the nodes 407 is coupled to the battery node 205 for receiving charge current or for sourcing power as previously described. The illustrated depiction is simplified and not intended to be limited to the configuration shown; any type of battery interface is contemplated. In one embodiment, the battery pack 207 is rechargeable as previously described. In an alternative embodiment, the battery pack 207 is not rechargeable but is simply a replaceable battery pack as understood by those skilled in the art. Also, the battery pack 207 may alternatively be integrated into the electronic device 600 rather than being removable via an external access (e.g., integrated battery configuration of MP3 or media players and the like).

The external power source 505 and the electronic device 600 include the compatible mating connectors 507 and 508 to provide the power source voltage DCV to the power circuit 500 and to convey the power control signal VC to the external power source 505. In one embodiment, the external power source 505 is an AC to DC adapter. When connected, the power source voltage DCV sources the input voltage VIN to the power circuit 500 and the PWM controller 503 controls the voltage level of the power source voltage DCV via the VC signal as previously described. The power circuit 500 provides the VOUT1 and VOUT2 output voltages as previously described for providing power to the functional circuitry 602 of the electronic device 600. If the external power source 505 is not available, then the battery pack 207 provides power if sufficiently charged. The electronic device 600 represents any type of battery-powered electronic device, including mobile, portable, or handheld devices, such as, for example, any type of personal digital assistant (PDA), personal computer (PC), portable computer, laptop computer, notebook computer, etc., cellular phone, personal media device, MP3 player, portable media player, etc.

The power circuit 500 is particularly advantageous for providing the source voltages of a notebook computer or the like. The capacitor voltage divider output VOUT is used to charge the battery and to provide source voltage for the buck converter which is regulated at a fixed voltage. The capacitor divider output voltage is regulated by the external power source 505 based on the VC feedback signal. The feedback VC signal is determined by the presence and the charging status of the battery pack 207. The duty cycle D of the capacitor voltage divider and the buck converter is controlled in such a way it regulates the buck converter output voltage at a desired voltage level, such as 5V or any other suitable voltage level. The system power bus voltage only varies within the battery voltage range. The PWM regulation functions are combined with the battery charger functions providing a lower cost solution compared to conventional buck converters. The power circuit 500 offers high power conversion efficiency and brings benefits to the thermal management of the electronic device 600. The size of the external power source 505 is reduced and the wiring requirements are relaxed. In particular the output voltage of the external power source 505 is increased allowing reduced output current to reduce size and enable smaller gauge or otherwise less expensive wires. The lower voltage level of VOUT1 is more suitable to provide power to converters providing power to main computer devices, such as a CPU (not shown), a GPU (not shown), memory devices (not shown), etc. Furthermore, the buck converter 117 is useful to convert the voltage of VOUT1 to a more suitable voltage level for other computer components, such as 5V useful for providing power to an HDD controller (not shown), a USB (not shown), etc.

Although the present invention has been described in considerable detail with reference to certain preferred versions thereof, other versions and variations are possible and contemplated. For example, the PWM controllers 111 and 503 may be implemented using discrete circuitry or integrated onto a chip or integrated circuit or any combination of both. Also, the PWM controllers 111 and 503 may be implemented as either analog or digital PWM controllers. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A voltage converter, comprising:
   a capacitor loop coupled between an input node, a reference node, and a first output node which develops a first output voltage;
   a fly capacitor coupled between first and second intermediate nodes;
   a switch circuit comprising a first switch having current terminals coupled between said input node and said first intermediate node, a second switch having current terminals coupled between said first intermediate node and said first output node, a third switch having current terminals coupled between said first output node and said second intermediate node, and a fourth switch having current terminals coupled between said second intermediate node and said reference node;
   an inductor having a first end coupled to said second intermediate node and having a second end coupled to a second output node which develops a second output voltage;
   an output capacitor coupled between said second output node and said reference node;
   a battery charger and controller operative to selectively couple an external power source node to said input node when said external power source node receives a DC voltage to provide an input voltage on said input node, to selectively couple a rechargeable battery node to said first output node when said external power source node does not receive said DC voltage, and which controls said switch circuit based on a pulse width modulation signal to regulate said second output voltage to a predetermined voltage level;
   wherein when said external power source node receives said DC voltage, said battery charger and controller controls said switch circuit based on said pulse width modulation signal to toggle coupling of said first intermediate node between said input node and said first output node and to toggle coupling of said second intermediate node between said first output node and said reference node; and wherein when said external power source node does not receive a DC voltage, said battery charger and controller turns off said first and second switches and controls said third and fourth switches based on said pulse width modulation signal to toggle coupling of said second intermediate node between said first output node and said reference node.

2. The voltage converter of claim 1, wherein said battery charger and controller comprises:
   a regulator having an input sensing said second output voltage and having an output providing said pulse width modulation signal; and
   a switch driver circuit having an input receiving said pulse width modulation signal and having a plurality of outputs controlling said first, second, third and fourth switches.

3. The voltage converter of claim 1, further comprising an external power source which provides said DC voltage to said external power source node.

4. The voltage converter of claim 3, wherein said external power source comprises an AC to DC converter.

5. The voltage converter of claim 1, wherein said capacitor loop comprises: a first capacitor coupled between said first output node and said reference node; and a second capacitor coupled between said input node and either one of said reference node and said first output node.

6. The voltage converter of claim 5, wherein:
   said second capacitor is coupled between said input node and said first output node; and
   further comprising a third capacitor coupled between said input node and said reference node.

7. The voltage converter of claim 1, wherein said battery charger and controller comprises a sense and switch circuit which detects said DC voltage provided on said external power node and activates an isolation switch to couple said external power source node to said input node.

8. The voltage converter of claim 1, wherein said battery charger and controller charges a battery coupled to said rechargeable battery node when said battery is detected and when an input voltage is detected on said input node.

9. An electronic device, comprising:
   a combined buck converter and capacitor voltage divider, comprising:
      a first capacitor coupled between a reference node and a first power node which develops a first source voltage;
      a second capacitor coupled between an input node and either one of said reference node and said first power node;
      a third capacitor coupled between first and second intermediate nodes;
      a switch circuit, comprising a first switch having current terminals coupled between said input node and said first intermediate node, a second switch having current terminals coupled between said first intermediate node and said first source node, a third switch having current terminals coupled between said first source node and said second intermediate node, and a fourth switch having current terminals coupled between said second intermediate node and said reference node;
      an inductor having a first end coupled to said second intermediate node and having a second end forming a second power node which develops a second source voltage;
      a fourth capacitor coupled between said second power node and said reference node;
      a battery charger and controller operative to selectively couple an external power source node to said input node when said external power source node receives a DC voltage to provide an input voltage on said input node, to selectively couple a rechargeable battery node to said first source node when said external power source node does not receive said DC voltage, and to control said switch circuit based on a pulse width modulation signal to regulate said second source voltage to a predetermined voltage level;
      wherein when said external power source node receives said DC voltage, said battery charger and controller controls said switch circuit based on said pulse width modulation signal to toggle coupling of said first intermediate node between said input node and said first output node and to toggle coupling of said second intermediate node between said first output node and said reference node; and
      wherein when said external power source node does not receive said DC voltage, said battery charger and controller turns off said first and second switches and controls said third and fourth switches based on said pulse width modulation signal to toggle coupling of said second intermediate node between said first source node and said reference node; and
   functional circuitry which receives said first and second source voltages and which performs functions of the electronic device.

10. The electronic device of claim 9, further comprising:
    a first connector electrically interfaced with said external power source node; and
    an AC to DC adapter having a second connector for mating with said first connector to provide said DC voltage.

11. The electronic device of claim 9, wherein said battery charger and controller comprises a sense and switch circuit which detects a DC voltage provided on said external power node and activates an isolation switch to couple said external power source node to said input node.

12. The electronic device of claim 9, wherein said battery charger and controller has a power input coupled to said input node and has an output coupled to said rechargeable battery node, wherein said battery charger and controller charges a battery coupled to said rechargeable battery node when said battery is detected and when said DC voltage is provided.

13. The electronic device of claim 9, wherein said combined buck converter and capacitor voltage divider and said functional circuitry are incorporated onto a printed circuit board.

14. The electronic device of claim 13, wherein said printed circuit board is provided within a notebook computer.

15. The electronic device of claim 9, further comprising:
    said second capacitor being coupled between said input node and said first output node; and
    a fifth capacitor coupled between said input node and said reference node.

16. A method of operating a power circuit providing first and second output voltages, comprising:
    coupling a first switch between an input node and a first intermediate node, coupling a second switch between the first intermediate node and a first output node which develops the first output voltage, coupling a third switch between the first output node and a second intermediate node, and coupling a fourth switch between the second intermediate node and a reference node;

coupling a capacitor loop between the input node, the reference node, and the first output node;

coupling a fly capacitor between the first and second intermediate nodes;

coupling an inductor between the second intermediate node and a second output node which develops the second output voltage;

controlling the duty cycle of a pulse width modulation signal for regulating the second output voltage to a predetermined level;

detecting whether a DC voltage is provided to an external power node;

when the DC voltage is provided to the external power node, coupling the external power node to the input node and controlling the first, second, third and fourth switches based on the pulse width modulation signal to toggle coupling of the first intermediate node between the input node and the first output node and to toggle coupling of the second intermediate node between the first output node and the reference node; and when the DC voltage is not provided to the external power node, coupling a battery node to the first output node, turning off the first and second switches, and controlling the third and fourth switches based on the pulse width modulation signal to toggle coupling of the second intermediate node between the first output node and the reference node.

17. The method of claim 16, further comprising:
monitoring the second output voltage and adjusting the duty cycle of the pulse width modulation signal; and
controlling at least two of the first, second, third and fourth switches based on the pulse width modulation signal.

18. The method of claim 16, further comprising converting an input voltage provided on the input node to a charge current to charge a battery coupled to the battery node when the DC voltage is provided to the external power node.

19. The method of claim 16, further comprising detecting a battery coupled to the battery node when the DC voltage is not provided and when the battery node is coupled to the first output node, and discharging the battery via the first output node.

20. The method of claim 16, wherein said coupling a capacitor loop comprises coupling a second capacitor between the first output node and the reference node and coupling a first end of a third capacitor to the input node and coupling a second end of the third capacitor to one of the first output node and the reference node.

* * * * *